US011875347B2

(12) United States Patent
Veltishchev (10) Patent No.: US 11,875,347 B2
(45) Date of Patent: Jan. 16, 2024

(54) SYSTEM AND COMPUTER-IMPLEMENTED METHOD FOR DEPERSONALIZING DATA BEING SWITCHED BETWEEN JURISDICTIONS IN A PAYMENTS SYSTEMS

(71) Applicant: Mastercard International Incorporated, Purchase, NY (US)

(72) Inventor: Mikhail Veltishchev, Moscow (RU)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 17/856,114

(22) Filed: Jul. 1, 2022

(65) Prior Publication Data

US 2022/0335425 A1  Oct. 20, 2022

Related U.S. Application Data

(63) Continuation of application No. 16/243,639, filed on Jan. 9, 2019, now abandoned.

(30) Foreign Application Priority Data

Jun. 14, 2018  (RU) .......................... RU2018121626

(51) Int. Cl.
*G06Q 20/40* (2012.01)
*G06F 21/62* (2013.01)
*G06Q 20/02* (2012.01)

(52) U.S. Cl.
CPC ......... *G06Q 20/40* (2013.01); *G06F 21/6254* (2013.01); *G06Q 20/027* (2013.01)

(58) Field of Classification Search
None
See application file for complete search history.

(56) References Cited

U.S. PATENT DOCUMENTS 6,938,022 B1 * 8/2005 Singhal .................. G06Q 30/06
705/78
7,707,120 B2 * 4/2010 Dominguez ........ H04L 63/0823
705/64

(Continued)

FOREIGN PATENT DOCUMENTS

WO    WO-0163452 A2 *  8/2001 ............. G06Q 20/04
WO    WO-2012042277 A1 *  4/2012 ............. G06Q 20/40

OTHER PUBLICATIONS

Gifford et al., "Payment Switches for Open Networks," IEEE, all pages. (Year: 1995).*

*Primary Examiner* — Jacob C. Coppola
(74) *Attorney, Agent, or Firm* — Hovey Williams LLP (57) ABSTRACT

A system and computer-implemented method for depersonalizing financial transaction data being switched by a switching service (e.g., an interchange network) between an acquirer and an issuer located in different countries. The acquirer's host sends a personalized transaction to a depersonalization service via an independent communications channel. The service depersonalizes the transaction and sends it back to the acquirer's host, and also sends a reverse depersonalization dictionary to the issuer's host. The acquirer's host sends the depersonalized transaction to the acquirer's interface, which sends it via the switching service to the issuer's interface, which sends it to the issuer's host. The issuer's host uses the dictionary to repersonalize the transaction, processes the repersonalized transaction, and sends a response code to the acquirer's host. The service and the acquirer's interface may independently calculate a hash value, and the acquirer's interface may send the depersonalized transaction only if the values match.

17 Claims, 4 Drawing Sheets

(56) References Cited

U.S. PATENT DOCUMENTS

| | | | | |
|---|---|---|---|---|
| 8,370,258 B2* | 2/2013 | Roberts | ............... | G06Q 20/10 705/64 |
| 2002/0116337 A1* | 8/2002 | Peled | ............... | G06Q 30/06 705/26.1 |
| 2003/0005312 A1* | 1/2003 | Sato | ............... | G06F 21/6254 713/189 |
| 2004/0111751 A1* | 6/2004 | Tsuria | ............... | H04N 7/162 725/6 |
| 2005/0036611 A1* | 2/2005 | Seaton | ............... | G06Q 20/4012 380/44 |
| 2007/0125838 A1* | 6/2007 | Law | ............... | G06Q 20/3223 705/65 |
| 2007/0125840 A1* | 6/2007 | Law | ............... | G06Q 20/326 705/65 |
| 2007/0250392 A1* | 10/2007 | Paulsen | ............... | G06Q 20/02 705/19 |
| 2008/0104128 A1* | 5/2008 | Drayer | ............... | G06F 21/6263 |
| 2008/0222048 A1* | 9/2008 | Higgins | ............... | G07G 1/14 705/67 |
| 2008/0275900 A1* | 11/2008 | Zurek | ............... | G06F 16/283 707/999.102 |
| 2010/0223186 A1* | 9/2010 | Hogan | ............... | G06Q 20/3278 708/250 |
| 2012/0221421 A1* | 8/2012 | Hammad | ............... | G06Q 10/00 705/16 |
| 2014/0258125 A1* | 9/2014 | Gerber | ............... | G06Q 20/40 705/44 |
| 2016/0125384 A1* | 5/2016 | Lemberger | ............... | G06Q 20/4015 705/44 |
| 2016/0140544 A1* | 5/2016 | Howe | ............... | G06F 21/6254 705/74 |
| 2016/0217461 A1* | 7/2016 | Gaddam | ............... | G06Q 20/383 |
| 2017/0053139 A1* | 2/2017 | Schenk | ............... | G06Q 20/34 |
| 2017/0098215 A1* | 4/2017 | Brotsky | ............... | G06Q 20/4037 |
| 2017/0103394 A1* | 4/2017 | Colhoun | ............... | G06Q 20/3672 |
| 2018/0047024 A1* | 2/2018 | Niehaus | ............... | G06Q 20/4016 |

* cited by examiner

SYSTEM AND COMPUTER-IMPLEMENTED METHOD FOR DEPERSONALIZING DATA BEING SWITCHED BETWEEN JURISDICTIONS IN A PAYMENTS SYSTEMS

CROSS REFERENCE TO RELATED APPLICATIONS

The present U.S. non-provisional patent application is a continuation and claims priority benefit of a prior-filed U.S. non-provisional patent application with the same title, Ser. No. 16/243,639, filed Jan. 9, 2019, which claims priority benefit of an earlier prior-filed Russian patent application, Serial No. 2018121626, filed Jun. 14, 2018. The entire contents of the identified prior-filed applications are hereby incorporated by reference as if set forth in their entirety.

FIELD

The present invention relates to systems and method for switching financial transactions, and more particularly, embodiments concern a system and computer-implemented method for reliably and reversibly depersonalizing financial transactions, and in particular financial transaction data, being switched between countries or other jurisdictions in a payments system.

BACKGROUND

Certain data which is switched through interchange networks during financial transactions are considered "personal data" in different countries, though exactly which data is considered personal depends on the particular regulations of each country. Switching this data is considered data processing, and the processing of personal data is also often subject to differing regulations. It is known to employ security measures to protect personal data, but this may require disclosing the security measures to government regulators, which may be undesirable for various reasons. It is also known to tokenize personal data by replacing it with unique identification symbols that retain all the essential information about the data without compromising its security, which makes it unusable to unauthorized persons. However, tokenization requires that tokens be sent to customers and requires that acquirers send tokens to end-users.

Interchange networks generally do not process such data, at least not in the sense of analyzing it. Instead, their primary concern is routing transactions between acquirers and card issuers, and the data is typically sent back and forth without the interchange network even looking at it. Interchange networks do analyze some transaction data during switching, but this is typically limited to the transaction format, particularly the fields that indicate where the transactions should be sent, not the personal data. The particular data analyzed in order to perform switching decisions may be referred to as "service data," which is not personal data. However, the personal data and the service data are still part of the same transaction, and therefore both are simultaneously exposed to the switching mechanism, which makes it difficult to argue that only part (the service data) of the transactional data is processed and the remainder (the personal data) is ignored. As a result, applicable regulations, which may vary significantly between countries, create a potential liability for transaction switching businesses, and unlike some other liabilities, this particular liability is not rewarded with any added value to the businesses.

This background discussion is intended to provide information related to the present invention which is not necessarily prior art.

SUMMARY

Embodiments address the above-described and other problems and limitations in the prior art by providing a system and computer-implemented method for reliably and reversibly depersonalizing financial transaction data being switched between countries or other jurisdictions in a payments system.

In a first embodiment, a computer-implemented method is provided for improving the function of a computer for depersonalizing transactions being switched between an acquirer and an issuer by a switching service during a financial transaction. The computer-implemented method may broadly comprise the following. A personalized particular transaction and an associated transaction identification may be sent from an acquirer's authorization host to a depersonalization service via an independent communications channel which is independent of the switching service. The personalized particular transaction may be depersonalized at the depersonalization service to produce a depersonalized particular transaction. The transaction identification may be sent from the depersonalization service to an acquirer's interface processor, the depersonalized particular transaction may be sent from the depersonalization service to the acquirer's authorization host, and the transaction identification and a reverse depersonalization dictionary may be sent from the depersonalization service to an issuer's authorization host. The depersonalized particular transaction may be sent from the acquirer's authorization host to the acquirer's interface processor, from the acquirer's interface processor to the issuer's interface processor via a multiprotocol label switching or other communications network operated by the switching service, and from the issuer's interface processor to the issuer's authorization host. The depersonalization of the depersonalized particular transaction may be reversed at the issuer's authorization host using the reverse depersonalization dictionary to produce a repersonalized particular transaction. The repersonalized particular transaction may be processed at the issuer's authorization host. A normal response code may be sent from the issuer's authorization host to the issuer's interface processor, and from the issuer's interface processor to the acquirer's authorization host and to the depersonalization service.

In a second embodiment, a system is provided for depersonalizing transactions being switched between an acquirer and an issuer by a switching service during a financial transaction. The system may broadly comprise an acquirer's authorization host and an acquirer's interface processor, with the acquirer's interface processor being interposed between the acquirer's authorization host and the switching service; an issuer's authorization host and an issuer's interface processor, with the issuer's interface processor being interposed between the issuer's authorization host and the switching service; an independent communications channel that is independent of the switching service; and a depersonalization service. The depersonalization service may be configured to receive a personalized particular transaction and a transaction identification from the acquirer's authorization host via the independent communication channel; depersonalize the personalized particular transaction to produce a depersonalized particular transaction; send the transaction identification to the acquirer's interface processor; send the depersonalized particular transaction to the acquirer's authorization host; and send the transaction identification and a reverse depersonalization dictionary to the issuer's authorization host. The acquirer's authorization host may be configured to send the depersonalized transaction to the acquirer's interface processor, and the acquirer's interface processor may be configured to send the depersonalized particular transaction to the issuer's interface processor via a multiprotocol label switching or other communications network operated by the switching service.

The issuer's interface processor may be configured to send the depersonalized particular transaction to the issuer's authorization host. The issuer's authorization host may be configured to reverse the depersonalization of the depersonalized particular transaction using the reverse depersonalization dictionary to produce a repersonalized particular transaction, process the repersonalized particular transaction, and send a normal response code to the issuer's interface processor. The issuer's interface processor may be configured to send the normal response code to the acquirer's authorization host and to the depersonalization service.

Various implementations of the first and second embodiments may include any one or more of the following features. The acquirer and the issuer may be located in different jurisdictions, and/or the switching service may be an interchange network in a payments system. A reason code may indicate that the personalized particular transaction must be depersonalized. The personalized particular transaction may be sent from the acquirer's authorization host directly to the acquirer's interface processor, and the personalized transaction may be rejected at the acquirer's interface processor, and the reason code may be sent from the acquirer's interface processor to the acquirer's authorization host.

A first hash value may be calculated for the depersonalized particular transaction at the depersonalization service. The first hash value may be sent along with the transaction identification from the depersonalization service to the acquirer's interface processor. A second hash value may be calculated for the depersonalized particular transaction at the acquirer's interface processor. The first hash value may be compared to the second hash value at the acquirer's interface processor, and if the first hash value does not match the second hash value, the depersonalized particular transaction may be rejected at the acquirer's interface processor, and the reason code may be sent from the acquirer's interface processor to the acquirer's authorization host. If the first hash value matches the second hash value, the depersonalized particular transaction may be sent from the acquirer's interface processor to the issuer's interface processor via the multiprotocol label switching or other communications network operated by the switching service.

In a third embodiment, a computer-implemented method is provided for improving the function of a computer for depersonalizing transactions being switched between an acquirer and an issuer by a switching service during a financial transaction. The computer-implemented method may broadly comprise the following. A personalized particular transaction and an associated transaction identification may be sent from an acquirer's authorization host to an acquirer's interface processor, and from the acquirer's interface processor to a depersonalization service via an independent communications channel which is independent of the switching service. The personalized particular transaction may be depersonalized at the depersonalization service to produce a depersonalized particular transaction. The depersonalized particular transaction may be sent from the depersonalization service to the acquirer's interface processor, and the transaction identification and a reverse depersonalization dictionary may be sent from the depersonalization service to an issuer's authorization host. The depersonalized particular transaction may be sent from the acquirer's interface processor to the issuer's interface processor via a multiprotocol label switching or other communications network operated by the switching service, and from the issuer's interface processor to the issuer's authorization host. The depersonalization of the depersonalized particular transaction may be reversed at the issuer's authorization host using the reverse depersonalization dictionary to produce a repersonalized particular transaction. The repersonalized particular transaction may be processed at the issuer's authorization host. A normal response code may be sent from the issuer's authorization host to the issuer's interface processor, and from the issuer's interface processor to the acquirer's authorization host and to the depersonalization service.

In a fourth embodiment, a system is provided for depersonalizing transactions being switched between an acquirer and an issuer by a switching service during a financial transaction. The system may broadly comprise an acquirer's authorization host and an acquirer's interface processor, with the acquirer's interface processor being interposed between the acquirer's authorization host and the switching service; an issuer's authorization host and an issuer's interface processor, with the issuer's interface processor being interposed between the issuer's authorization host and the switching service; an independent communications channel that is independent of the switching service; and a depersonalization service. The depersonalization service may be configured to receive a personalized particular transaction and a transaction identification from the acquirer's interface processor via the independent communication channel; depersonalize the personalized particular transaction to produce a depersonalized particular transaction; send the depersonalized particular transaction to the acquirer's interface processor; and send the transaction identification and a reverse depersonalization dictionary to the issuer's authorization host. The acquirer's interface processor may be configured to send the depersonalized particular transaction to the issuer's interface processor via a multiprotocol label switching or other communications network operated by the switching service, and the issuer's interface processor may be configured to send the depersonalized particular transaction to the issuer's authorization host. The issuer's authorization host may be configured to reverse the depersonalization of the depersonalized particular transaction using the reverse depersonalization dictionary to produce a repersonalized particular transaction, process the repersonalized particular transaction, and send a normal response code to the issuer's interface processor, and the issuer's interface processor may be configured to send the normal response code to the acquirer's authorization host and to the depersonalization service.

Various implementations of the third and fourth embodiments may include any one or more of the following features. The acquirer and the issuer may be located in different jurisdictions, and/or the switching service may be an interchange network in a payments system. A reason code may indicate that the personalized particular transaction must be depersonalized.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly, embodiments concern a system and computer-implemented method for reliably and reversibly depersonalizing transaction data being switched between countries or other jurisdictions in a payments system. In more detail, embodiments provide for reliably and reversibly depersonalizing financial transaction data in order to allow for switching transactions that contain personal data across multiple jurisdictions without becoming subject to or incurring liability under the personal data protection regulations of any particular jurisdiction.

Depersonalization involves applying a set of actions to personal data to make it difficult or substantially impossible to match the personal data to the person who is the subject of the personal data. Depersonalization must be a reversible operation, so that it is possible to eventually restore, or "repersonalize," the data. Importantly, depersonalization is not tokenization, and in fact, once data is depersonalized it can also be tokenized. Depersonalization is also not a mere algorithm to depersonalize data, but is an application of depersonalization techniques in a payments system.

One way to achieve depersonalization during data processing is to replace the personal data with identifiers and create a dictionary that matches the identifiers with the personal data so that the process can be reversed. In one implementation, hashing (e.g., SHA-256) may be used to depersonalize the data, though in other implementations, substantially any suitable depersonalization technique may be used. Embodiments depersonalize data before it reaches the switching service, and may therefore use infrastructure which is not part of the switching service, though certain information may be exchanged with the switching service. In various scenarios, one party may be located in a country or other jurisdiction with different, complex, or otherwise problematic personal data protection laws, or both parties may be located in different countries or jurisdictions with problematic personal data protection laws.

Figure 1:
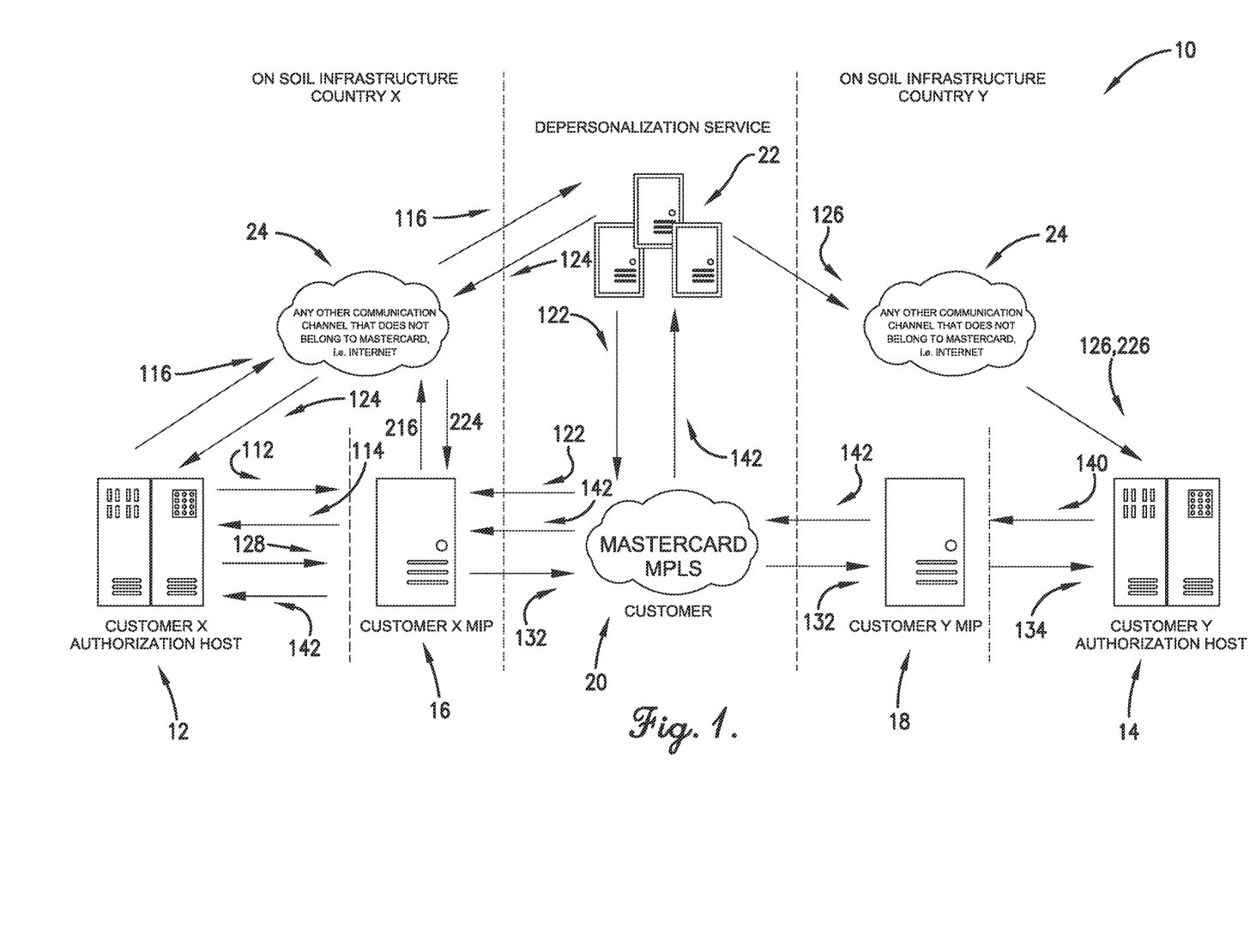
FIG. 1 is diagram of an embodiment of a system for depersonalizing financial transaction data being switched between jurisdictions.

Referring to FIG. 1, an embodiment of a system 10 is shown for reliably and reversibly depersonalizing transaction data being switched between countries or other jurisdictions in a payments system. The system 10 may broadly include existing infrastructure components and new infrastructure components. The existing infrastructure components may include Customer X and Customer Y authorization hosts 12,14 for members, Customer X and Customer Y interface processors (IPs) 16,18 (such as the Mastercard Interface Processor (MIP) or the Visa Access Point (VAP)) that the members may use to switch their transactions through the interchange network, and a communications network 20 which may be a public or private network that connects all of the IPs 16,18 to each other and which is the medium for switching the transactions. In one implementation, the communications network 20 may be a multiprotocol label switching (MPLS) network. The customers may be acquirers and issuers (e.g., Customer X may be an acquirer, and Customer Y may be an issuer), the members may be individual sellers of goods or services seeking payment from customers using payment cards, and the IPs and the MPLS may be provided by an interchange network such as Mastercard.

When an acquirer's authorization host 12 receives an authorization request from a member, the acquirer's authorization host 12 may determine the type of payment card (e.g., Visa, Mastercard, AMEX, etc.). Based on the type of payment card, the acquirer's authorization host 12 may send the transaction information to the appropriate interchange network for verification. Authorization hosts 12,14 typically have both a MIP (Mastercard Interface Processor), which is a direct connection to Mastercard, and a VAP (Visa Access Point), which is a direct connection to Visa, which provide low cost, high-speed connections directly to those interchange networks. The MPLS or other communications network 20 may employ a data-carrying technique for high-performance telecommunications networks, which directs data from one network node to the next based on short path labels rather than long network addresses, thereby avoiding complex lookups in a routing table.

The new infrastructure components may include a depersonalization service 22, and an independent communications channel that is independent of the switching service. The depersonalization service 22 may perform depersonalization by accepting depersonalization requests from acquirers' authorization hosts and IPs and fulfilling the requests by replacing personal data in transactions with identifiers, and maintaining reverse depersonalization dictionaries that match the identifiers and the respective personal data. The depersonalization service 22 may perform additional functions described below. The depersonalization service 22 may communicate with customers' authorization hosts 12,14 via the independent communications channel 24 and with customers' IPs 16,18 via the MPLS or other communications network 20. The independent communications channel 24 may involve a secured connectivity over a public Internet line, and the security mechanisms may be industry standard.

The existing and new infrastructure components may be configured as follows. The acquirer's IP 16 may be configured to determine whether a particular transaction it receives from the acquirer's authorization host 12 should be depersonalized and whether or not the particular transaction has been depersonalized before the personal data in the transaction is read. If the particular transaction should be but has not been depersonalized, then the acquirer's IP 16 may be configured to reject the particular transaction. Relatedly, the acquirer's IP 16 may be configured to identify a non-depersonalized transaction mimicking a depersonalized transaction. In one implementation, the system 10 may be configured as follows to accomplish these functions. The acquirer's IP logic may be configured to read a Transaction identification (ID) field before reading any other fields in a particular transaction coming from the acquirer's authorization host 12. Additionally or alternatively, another ISO-8583 field may be added that acts as a unique identifier of the particular transaction. The Transaction ID may not be completely unique, but may at least be unique between all of the acquirers using the particular acquirer's IP 16. The acquirer's name/interbank card association (ICA) identification (or similarly used bank or customer identifier for payment card networks other than Mastercard) may be derivable from this Transaction ID. The Transaction ID may not contain personal data, and may exist in the particular transaction throughout its lifecycle. The IP logic may be configured to allow for making decisions after reading the Transaction ID but before reading any other fields in the particular transaction. The possible decisions may be limited to or at least may include to calculate a first hash value of the received particular transaction or to reject the particular transaction back to the acquirer's authorization host 12. A new reason code may be defined for use during such rejections back to the acquirer's authorization host 12. The reason code may communicate or otherwise indicate that the transaction must be depersonalized but is not. If an acquirer is enabled for depersonalization, then the acquirer's authorization host 12 may be required to send the Transaction ID to the depersonalization service 22 over the independent communication channel 24, whether by default or, alternatively, upon receiving the reason code.

The depersonalization service 22 may be configured to calculate the first hash value of the depersonalized transaction, the depersonalization of which was requested by a particular acquirer, and send the calculated first hash value along with the Transaction ID to the acquirer's IP 16 with which the acquirer has opened the session. This may happen before the depersonalized transaction is sent back to the acquirer's authorization host 12 to fulfill its request.

The acquirer's IP logic may be configured so that when the acquirer's IP 16 receives the Transaction ID along with the first hash value of the depersonalized transaction, the acquirer's IP 16 stores both in electronic memory either until the particular transaction with the same Transaction ID is received from the acquirer's authorization host 12 or until the expiration of a hold period. If the hold period expires, a reason code may be generated to communicate or otherwise indicate that a depersonalized transaction was expected from the acquirer's authorization host 12 but was not received. The acquirer's IP logic may be configured so that while the Transaction ID and the first hash value are still in the electronic memory of the acquirer's IP 16, if the particular transaction with the same Transaction ID is received by the acquirer's IP 16, the acquirer's IP 16 may perform its own hash calculation and compare the resulting second hash value with the first hash value stored in the electronic memory and associated with the same Transaction ID. If the first and second hash values match, then the transaction may be determined to have been depersonalized. Further, it ensures that the particular transaction was depersonalized by the depersonalization service 22, and that no one tampered with it in transit between the depersonalization service 22, the acquirer's authorization host 12, and the acquirer's IP 16. The acquirer's IP logic may be so configured only if the acquirer's IP 16 is enabled for depersonalization.

The issuer's authorization host 14 may be configured to reverse the depersonalization after it receives the depersonalized particular transaction from the issuer's IP 18. In one implementation, the system 10 may be configured as follows to accomplish this function. The depersonalization service 22 may be configured to read the particular transaction in order to determine the destination issuer, and to reliably send the Transaction ID, first hash value, and dictionary to the destination issuer's authorization host 14. The issuers' authorization host 14 may be configured to receive this information from the depersonalization service 22 and store it in an electronic memory either until the depersonalized particular transaction arrives from the issuer's IP 18, in which case the information received from the depersonalization service 22 can be used to reverse the depersonalization before processing the transaction and deleting the dictionary from the electronic memory, or until the expiration of a hold period. If the hold period expires, then a reason code may be generated to communicate or otherwise indicate that a depersonalized transaction was expected from the acquirer's IP 16 but was not received. The acquirer's IP 16 may be configured to determine whether or not the particular transaction should be depersonalized before reaching the issuer's IP 18. In one implementation, this may be accomplished by adding a respective flag to a bank identification number (BIN) table of the acquirer's IP 16, in which the BINs that belong to issuers that are enabled for depersonalization may be flagged.

If the acquirer associated with the particular transaction is not enabled for the depersonalization service 22, but the issuer is so enabled, then the acquirer's IP 16 may be configured to request depersonalization of the transaction from the depersonalization service 22. In one implementation, the system 10 may be configured as follows to accomplish this function. If the acquirer is not enabled for the depersonalization service 22, but the acquirer's IP 16 receives a transaction from the acquirer's authorization host 12 which is destined for an issuer which is enabled for the depersonalization, then the acquirer's IP 16 may request that the depersonalization service 22 depersonalize the transaction before sending it to the issuer. This step may be conceptually similar to personal identification number (PIN) exchange behavior, except that rather than a node security platform (NSP) module there is the depersonalization service 22. The issuer's authorization host 14 may then reverse the depersonalization of the depersonalized particular transaction, as described above.

The system 10 may be configured to inform the depersonalization service 22 that the depersonalization of the depersonalized particular transaction has been successfully reversed. In one implementation, the issuer's IP 18 may duplicate its authorization response codes for the depersonalization service 22, and the depersonalization service 22 may be configured to process these codes. The authorization response codes may be newly created or existing codes.

Figure 2:
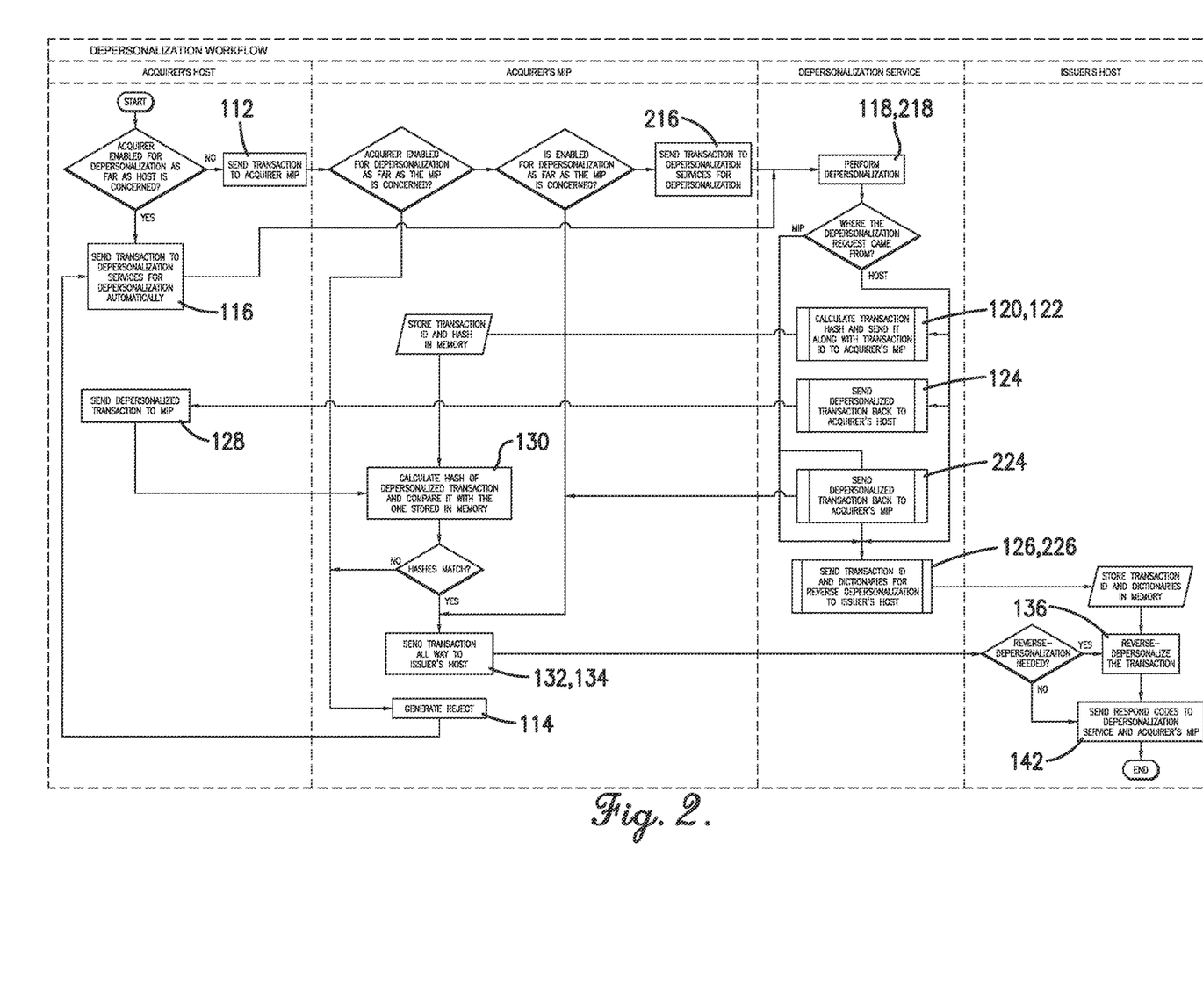
FIG. 2 is a flowchart of steps in the function of the system of FIG. 1.
Figure 3:
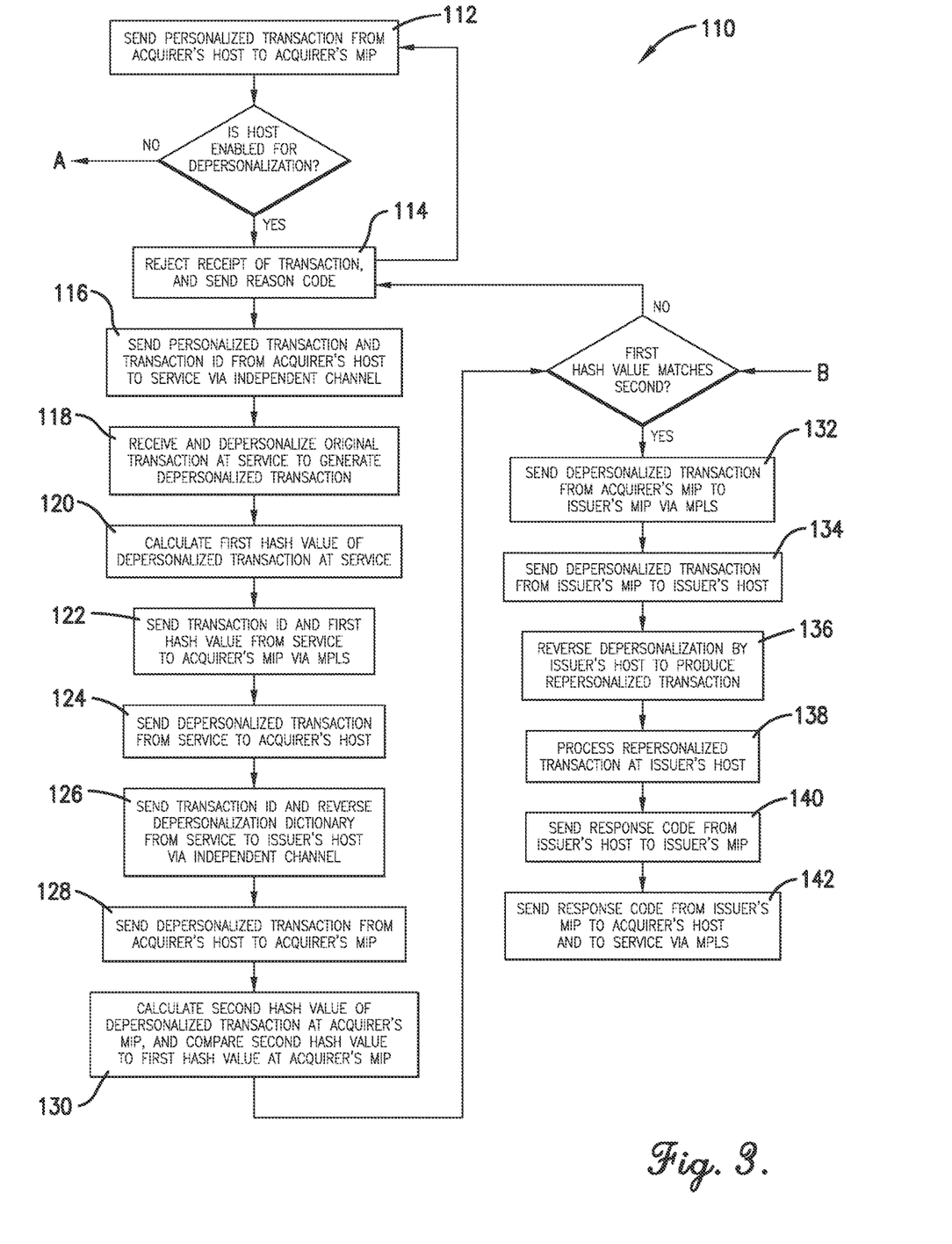
FIG. 3 is a flowchart of steps in an embodiment of a computer-implemented method for depersonalizing financial transaction data being switched between jurisdictions.
Figure 4:
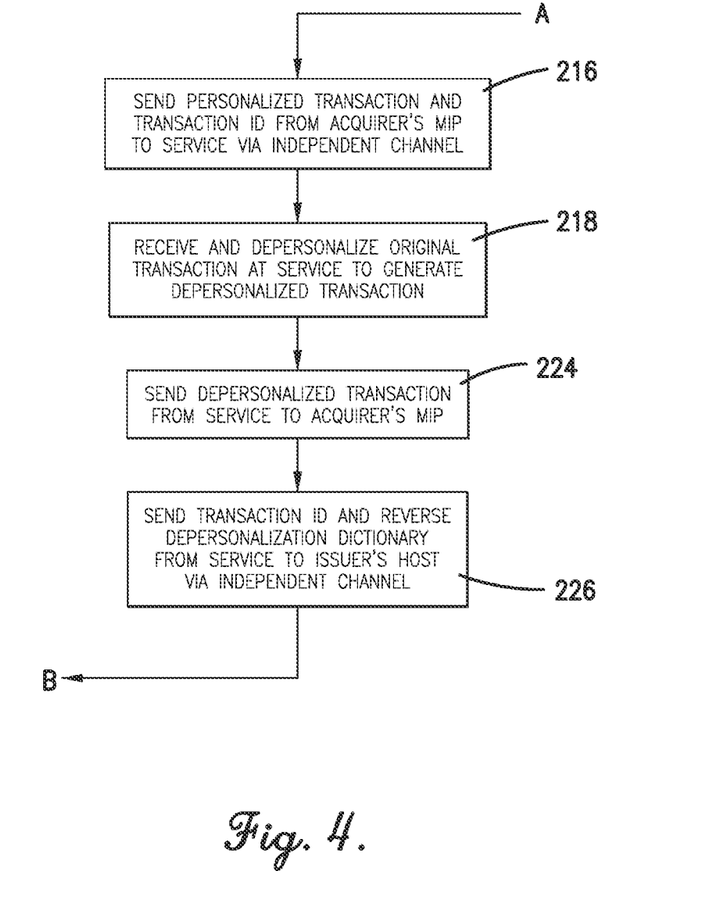
FIG. 4 is a flowchart of additional steps in an implementation of the computer-implemented method of FIG. 3.

Referring to FIGS. 2-4, the system 10 may function substantially as follows. The depersonalization service 22 may receive a personalized particular transaction and a Transaction ID from the acquirer's authorization host 12 via the independent communication channel 24, as shown in 116. The depersonalization service 22 may depersonalize the personalized particular transaction to produce a depersonalized particular transaction, as shown in 118. The depersonalization service 22 may calculate a first hash value for the depersonalized particular transaction, as shown in 120, send the Transaction ID and the first hash value to the acquirer's IP 16, as shown in 122, send the depersonalized particular transaction to the acquirer's authorization host 12, as shown in 124, and send the Transaction ID and a reverse depersonalization dictionary to the issuer's authorization host 14, as shown in 126.

The acquirer's authorization host 12 may send the depersonalized transaction to the acquirer's IP 16, as shown in 128. The acquirer's IP 16 may calculate a second hash value for the depersonalized particular transaction, and compare the first hash value to the second hash value, as shown in 130. If the first hash value does not match the second hash value, the acquirer's IP 16 may reject the depersonalized particular transaction, and send a reason code to the acquirer's authorization host 12, as shown in 114. If the first hash value matches the second hash value, the acquirer's IP 16 may send the depersonalized particular transaction to the issuer's IP 18 via the MPLS or other communications network 20 operated by the switching service, as shown in 132.

The issuer's IP 18 may send the depersonalized particular transaction to the issuer's authorization host 14, as shown in 134. The issuer's authorization host 14 may reverse the depersonalization of the depersonalized particular transaction using the reverse depersonalization dictionary to produce a repersonalized particular transaction, as shown in 136. The issuer's authorization host 14 may process the repersonalized particular transaction, as shown in 138, and send a normal response code to the issuer's IP 18, as shown in 140, and the issuer's IP 18 may send the normal response code to the acquirer's authorization host 16 and to the depersonalization service 22, as shown in 142.

If the acquirer's authorization host 12 is not enabled for depersonalization, then the acquirer's IP 16 may perform several of the steps otherwise performed by the acquirer's authorization host 12. In particular, as shown in FIG. 4, the acquirer's IP 16 (rather than the acquirer's authorization host 12) may send the personalized particular transaction and the associated Transaction ID to the depersonalization service 22 via the independent communications channel 24, as shown in 216. The personalized particular transaction may be received and processed at the depersonalization service 22 as follows. The depersonalization service 22 may depersonalize the personalized particular transaction to produce a depersonalized particular transaction, as shown in 218. The depersonalization service 22 may send the depersonalized particular transaction to the acquirer's IP 16, as shown in 224. The depersonalization service 22 may send the Transaction ID and the reverse depersonalization dictionary to the issuer's authorization host 14, as shown in 226. Neither the first hash value nor the second hash value may be used in this scenario given the direct communication between the acquirer's IP 16 and the depersonalization service 22.

The system 10 may include more, fewer, or alternative components and/or perform more, fewer, or alternative actions, including those discussed elsewhere herein, and particularly those discussed in the following section describing the method.

Referring again to FIGS. 3 and 4, an embodiment of a computer-implemented method 110 is shown for improving the function of a computer for reliably and reversibly depersonalizing transaction data being switched between countries in a payments system. The computer-implemented method 110 may be a corollary to the functionality of the above-described system 10, and may be similarly implemented using the various components of the system 10 within the above-described exemplary operating environments. Broadly, the method 110 may proceed as follows. For the purpose of illustration, the computer-implemented method 110 is described in the context of an example scenario in which Customer X is an acquirer located in Country X and Customer Y is an issuer located in Country Y, and the interchange network which switches transactions between Customers X and Y is Mastercard.

A personalized (i.e., not depersonalized) particular transaction may be sent from the acquirer's authorization host 12 to the acquirer's IP 16, as shown in 112. This should not occur if the acquirer's authorization host 12 is enabled for automatic depersonalization. If, in fact, the acquirer's authorization host 12 is enabled for depersonalization, then the acquirer's MIP 16 may reject the personalized particular transaction, and may communicate a reason code to the acquirer's authorization host 12 which indicates that that the personalized particular transaction must be depersonalized, as shown in 114. If, in fact, the acquirer's authorization host 12 is not enabled for depersonalization, then the acquirer's MIP 16 may perform several of the steps which would otherwise be performed by the acquirer's authorization host 12, as shown in FIG. 4.

The personalized particular transaction and an associated Transaction ID may be sent from the acquirer's authorization host 12 to the depersonalization service 22 via the independent communications channel 24, as shown in 116. The personalized particular transaction may be received and processed at the depersonalization service 22 as follows. The personalized particular transaction may be depersonalized at the depersonalization service 22 to produce a depersonalized particular transaction, as shown in 118, a first hash value for the depersonalization particular transaction may be calculated at the depersonalization service 22, as shown in 120, and the Transaction ID and the first hash value may be sent from the depersonalization service 22 to the acquirer's MIP 16, as shown in 122. The depersonalized particular transaction may be sent from the depersonalization service 22 to the acquirer's authorization host 12, as shown in 124. The Transaction ID and a reverse depersonalization dictionary may be sent from the depersonalization service 22 to the issuer's authorization host 14, as shown in 126.

The depersonalized particular transaction may be sent from the acquirer's authorization host 12 to the acquirer's MIP 16, as shown in 128. A second hash value may be calculated by the acquirer's MIP 16, and the first hash value may be compared to the second hash value by the acquirer's MIP 16, as shown in 130. If the hash values do not match, then the transaction may be rejected by the acquirer's MIP 16, and a response code may be sent to the acquirer's authorization host 12. If the hash values match, then the depersonalized particular transaction may be sent from the acquirer's MIP 16 to the issuer's IP 18 via the MPLS or other communications network 20, as shown in 132, and from the issuer's MIP 18 to the issuer's authorization host 14, as shown in 134.

The depersonalization of the depersonalized particular transaction may be reversed at the issuer's authorization host 14 using the information received from the depersonalization service 22 to produce a repersonalized particular transaction, as shown in as shown in 136. The repersonalized particular transaction may be processed at the issuer's authorization host 14, as shown in 138, after which normal response codes may be sent from the issuer's authorization host 18 to the issuer's MIP 18, as shown in 140, and from the issuer's MIP 18 to the acquirer's authorization host 12 and to the depersonalization service 22, as shown in 142.

As mentioned, if the acquirer's authorization host 12 is not enabled for depersonalization, then the acquirer's MIP 16 may perform several of the steps otherwise performed by the acquirer's authorization host 12. In particular, as shown in FIG. 4, the personalized particular transaction and the associated Transaction ID may be sent from the acquirer's MIP 16 (rather than the acquirer's authorization host 12) to the depersonalization service 22 via the independent communications channel 24, as shown in 216. The personalized particular transaction may be received and processed at the depersonalization service 22 as follows. The personalized particular transaction may be depersonalized at the depersonalization service 22 to produce a depersonalized particular transaction, as shown in 218. The depersonalized particular transaction may be sent from the depersonalization service 22 to the acquirer's MIP 14, as shown in 224. The Transaction ID and the reverse depersonalization dictionary may be sent from the depersonalization service 22 to the issuer's authorization host 14, as shown in 226. Neither the first hash value nor the second hash value may be used in this scenario given the direct communication between the acquirer's MIP 16 and the depersonalization service 22.

The computer-implemented method 110 may include more, fewer, or alternative actions, including those discussed elsewhere herein.

Any actions, functions, steps, and the like recited herein may be performed in the order shown in the figures and/or described above, or may be performed in a different order. Furthermore, some steps may be performed concurrently as opposed to sequentially. Although the computer-implemented method is described above, for the purpose of illustration, as being executed by an exemplary system and/or exemplary physical elements, it will be understood that the performance of any one or more of such actions may be differently distributed without departing from the spirit of the present invention.

A computer-readable medium comprising a non-transitory medium may include an executable computer program stored thereon and for instructing one or more processing elements to perform some or all of the steps described herein, including some or all of the steps of the computer-implemented method. The computer program stored on the computer-readable medium may instruct the processing element and/or other components of the system to perform additional, fewer, or alternative actions, including those discussed elsewhere herein.

All terms used herein are to be broadly interpreted unless otherwise stated. For example, the term "payment card" and the like may, unless otherwise stated, broadly refer to substantially any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

The terms "processing element," "processor," and the like, as used herein, may, unless otherwise stated, broadly refer to any programmable system including systems using central processing units, microprocessors, microcontrollers, reduced instruction set circuits (RISC), application specific integrated circuits (ASIC), logic circuits, and any other circuit or processor capable of executing the functions described herein. The above examples are example only, and are thus not intended to limit in any way the definition and/or meaning of the term "processing element." In particular, "a processing element" may include one or more processing elements individually or collectively performing the described functions. In addition, the terms "software," "computer program," and the like, may, unless otherwise stated, broadly refer to any executable code stored in memory for execution on mobile devices, clusters, personal computers, workstations, clients, servers, and a processor or wherein the memory includes read-only memory (ROM), electronic programmable read-only memory (EPROM), random access memory (RAM), erasable electronic programmable read-only memory (EEPROM), and non-volatile RAM (NVRAM) memory. The above memory types are exemplary only, and are thus not limiting as to the types of memory usable for storage of a computer program.

The terms "computer," "computing device," and the like, as used herein, may, unless otherwise stated, broadly refer to substantially any suitable technology for processing information, including executing software, and may not be limited to integrated circuits referred to in the art as a computer, but may broadly refer to a microcontroller, a microcomputer, a programmable logic controller (PLC), an application specific integrated circuit, and other programmable circuits, and these terms are used interchangeably herein.

The term "communications network" and the like, as used herein, may, unless otherwise stated, broadly refer to substantially any suitable technology for facilitating communications (e.g., GSM, CDMA, TDMA, WCDMA, LTE, EDGE, OFDM, GPRS, EV-DO, UWB, WiFi, IEEE 802 including Ethernet, WiMAX, and/or others), including supporting various local area networks (LANs), personal area networks (PAN), or short range communications protocols.

The term "communications element" and the like, as used herein, may, unless otherwise stated, broadly refer to substantially any suitable technology for facilitating communications, and may include one or more transceivers (e.g., WWAN, WLAN, and/or WPAN transceivers) functioning in accordance with IEEE standards, 3GPP standards, or other standards, and configured to receive and transmit signals via a communications network.

The term "memory element," "data storage device," and the like, as used herein, may, unless otherwise stated, broadly refer to substantially any suitable technology for storing information, and may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Although the invention has been described with reference to the one or more embodiments illustrated in the figures, it

The invention claimed is:

1. A computer-implemented method for improving the function of a computer for depersonalizing transactions being switched between an acquirer system located in a first country and an issuer system located in a second country by a switching service during a financial transaction, the computer-implemented method comprising:
   sending a personalized particular transaction and an associated transaction identification from the acquirer system located in the first country to a depersonalization service via an independent communications channel which is independent of the switching service;
   depersonalizing the personalized particular transaction at the depersonalization service to produce a depersonalized particular transaction;
   sending the transaction identification and the depersonalized particular transaction from the depersonalization service to the acquirer system located in the first country;
   sending the transaction identification and a reverse depersonalization dictionary from the depersonalization service to the issuer system located in the second country;
   sending the depersonalized particular transaction from the acquirer system located in the first country to the issuer system located in the second country via a communications network operated by the switching service;
   reversing the depersonalization of the depersonalized particular transaction at the issuer system located in the second country using the reverse depersonalization dictionary to produce a repersonalized particular transaction;
   processing the repersonalized particular transaction at the issuer system; and
   sending a normal response code from the issuer system located in the second country to the acquirer system located in the first country and to the depersonalization service,
   wherein neither the personalized particular transaction nor the repersonalized particular transaction are sent between the first country and the second country.

2. The computer-implemented method of claim 1 for improving the function of the computer for depersonalizing transactions being switched between the acquirer system located in the first country and the issuer system located in the second country by the switching service during the financial transaction, wherein the acquirer system includes an acquirer's authorization host and an acquirer's interface processor, and the issuer system includes an issuer's authorization host and an issuer's interface processor, the method further comprising:
   sending the personalized particular transaction and the associated transaction identification from the acquirer's authorization host located in the first country to the depersonalization service via the independent communications channel which is independent of the switching service;
   depersonalizing the personalized particular transaction at the depersonalization service to produce the depersonalized particular transaction;
   sending the transaction identification from the depersonalization service to the acquirer's interface processor located in the first country;
   sending the depersonalized particular transaction from the depersonalization service to the acquirer's authorization host located in the first country;
   sending the transaction identification and the reverse depersonalization dictionary from the depersonalization service to the issuer's authorization host located in the second country;
   sending the depersonalized particular transaction from the acquirer's authorization host to the acquirer's interface processor;
   sending the depersonalized particular transaction from the acquirer's interface processor located in the first country to the issuer's interface processor located in the second country via the communications network operated by the switching service;
   sending the depersonalized particular transaction from the issuer's interface processor to the issuer's authorization host;
   reversing the depersonalization of the depersonalized particular transaction at the issuer's authorization host located in the second country using the reverse depersonalization dictionary to produce the repersonalized particular transaction;
   processing the repersonalized particular transaction at the issuer's authorization host;
   sending the normal response code from the issuer's authorization host to the issuer's interface processor; and
   sending the normal response code from the issuer's interface processor located in the second country to the acquirer's authorization host located in the first country and to the depersonalization service,
   wherein neither the personalized particular transaction nor the repersonalized particular transaction are sent between the first country and the second country.

3. The computer-implemented method of claim 2, wherein the switching service is an interchange network in a payments system.

4. The computer-implemented method of claim 2, wherein a reason code indicates that the personalized particular transaction must be depersonalized.

5. The computer-implemented method of claim 2, further including—
   sending the personalized particular transaction directly from the acquirer's authorization host to the acquirer's interface processor; and
   rejecting the personalized transaction at the acquirer's interface processor, and sending the reason code from the acquirer's interface processor to the acquirer's authorization host.

6. The computer-implemented method of claim 2, further including—
   calculating a first hash value for the depersonalized particular transaction at the depersonalization service;
   sending the first hash value along with the transaction identification from the depersonalization service to the acquirer's interface processor;
   calculating a second hash value for the depersonalized particular transaction at the acquirer's interface processor;
   comparing the first hash value to the second hash value at the acquirer's interface processor, and if the first hash value does not match the second hash value, rejecting the depersonalized particular transaction at the acquirer's interface processor, and sending a reason code from the acquirer's interface processor to the acquirer's authorization host; and if the first hash value matches the second hash value, sending the depersonalized particular transaction from the acquirer's interface processor located in the first country to the issuer's interface processor located in the second country via the communications network operated by the switching service.

7. A computer-implemented method for improving the function of a computer for depersonalizing transactions being switched between an acquirer located in a first jurisdiction and an issuer located in a second jurisdiction by a switching service during a financial transaction, the computer-implemented method comprising:

sending a personalized particular transaction and an associated transaction identification from an acquirer's authorization host located in the first jurisdiction to a depersonalization service via an independent communications channel which is independent of the switching service;

depersonalizing the personalized particular transaction at the depersonalization service to produce a depersonalized particular transaction;

sending the transaction identification from the depersonalization service to the acquirer's interface processor located in the first jurisdiction;

sending the depersonalized particular transaction from the depersonalization service to the acquirer's authorization host located in the first jurisdiction;

sending the transaction identification and a reverse depersonalization dictionary from the depersonalization service to an issuer's authorization host located in the second jurisdiction;

sending the depersonalized particular transaction from the acquirer's authorization host to the acquirer's interface processor;

sending the depersonalized particular transaction from the acquirer's interface processor located in the first jurisdiction to the issuer's interface processor located in the second jurisdiction via a communications network operated by the switching service;

sending the depersonalized particular transaction from the issuer's interface processor to the issuer's authorization host;

reversing the depersonalization of the depersonalized particular transaction at the issuer's authorization host located in the second jurisdiction using the reverse depersonalization dictionary to produce a repersonalized particular transaction;

processing the repersonalized particular transaction at the issuer's authorization host;

sending a normal response code from the issuer's authorization host to the issuer's interface processor; and sending the normal response code from the issuer's interface processor located in the second jurisdiction to the acquirer's authorization host located in the first jurisdiction and to the depersonalization service, wherein neither the personalized particular transaction nor the repersonalized particular transaction are sent between the first country and the second country.

8. The computer-implemented method of claim 7, wherein the switching service is an interchange network in a payments system.

9. The computer-implemented method of claim 7, wherein a reason code indicates that the personalized particular transaction must be depersonalized.

10. The computer-implemented method of claim 7, further including— sending the personalized particular transaction directly from the acquirer's authorization host to the acquirer's interface processor; and rejecting the personalized transaction at the acquirer's interface processor, and sending the reason code from the acquirer's interface processor to the acquirer's authorization host.

11. The computer-implemented method of claim 7, further including— calculating a first hash value for the depersonalized particular transaction at the depersonalization service;

sending the first hash value along with the transaction identification from the depersonalization service to the acquirer's interface processor;

calculating a second hash value for the depersonalized particular transaction at the acquirer's interface processor;

comparing the first hash value to the second hash value at the acquirer's interface processor, and if the first hash value does not match the second hash value, rejecting the depersonalized particular transaction at the acquirer's interface processor, and sending a reason code from the acquirer's interface processor to the acquirer's authorization host; and if the first hash value matches the second hash value, sending the depersonalized particular transaction from the acquirer's interface processor located in the first jurisdiction to the issuer's interface processor located in the second jurisdiction via the communications network operated by the switching service.

12. A system for depersonalizing transactions being switched between an acquirer located in a first jurisdiction and an issuer located in a second jurisdiction by a switching service during a financial transaction, the system comprising:

an acquirer's authorization host located in the first jurisdiction and an acquirer's interface processor located in the first jurisdiction, with the acquirer's interface processor being interposed between the acquirer's authorization host and the switching service;

an issuer's authorization host located in the second jurisdiction and an issuer's interface processor located in the second jurisdiction, with the issuer's interface processor being interposed between the issuer's authorization host and the switching service;

an independent communications channel that is independent of the switching service;

a depersonalization service configured to— receive a personalized particular transaction and a transaction identification from the acquirer's authorization host via the independent communication channel, depersonalize the personalized particular transaction to produce a depersonalized particular transaction, send the transaction identification to the acquirer's interface processor, send the depersonalized particular transaction to the acquirer's authorization host, and send the transaction identification and a reverse depersonalization dictionary to the issuer's authorization host;

the acquirer's authorization host configured to send the depersonalized transaction to the acquirer's interface processor;

the acquirer's interface processor located in the first jurisdiction configured to send the depersonalized particular transaction to the issuer's interface processor located in the second jurisdiction via a communications network operated by the switching service;

the issuer's interface processor configured to send the depersonalized particular transaction to the issuer's authorization host;

the issuer's authorization host configured to—
- reverse the depersonalization of the depersonalized particular transaction using the reverse depersonalization dictionary to produce a repersonalized particular transaction,
- process the repersonalized particular transaction, and
- send a normal response code to the issuer's interface processor; and the issuer's interface processor located in the second jurisdiction configured to send the normal response code to the acquirer's authorization host located in the first jurisdiction and to the depersonalization service, wherein neither the personalized particular transaction nor the repersonalized particular transaction are sent between the first country and the second country.

13. The system of claim 12, wherein the first jurisdiction is a first country and the second jurisdiction is a second country.

14. The system of claim 12, wherein the switching service is an interchange network in a payments system.

15. The system of claim 12, wherein a reason code indicates that the personalized particular transaction must be depersonalized.

16. The system of claim 12, the acquirer's interface processor further configured to reject the personalized particular transaction sent directly from the acquirer's authorization host to the acquirer's interface processor, and send the reason code to the acquirer's authorization host.

17. The system of claim 12, further including—
the depersonalization service further configured to—
- calculate a first hash value for the depersonalized particular transaction, and
- send the first hash value along with the transaction identification to the acquirer's interface processor; and the acquirer's interface processor located in the first jurisdiction further configured to—
- calculate a second hash value for the depersonalized particular transaction,
- compare the first hash value to the second hash value, and if the first hash value does not match the second hash value, reject the depersonalized particular transaction, and send the reason code to the acquirer's authorization host, and
- if the first hash value matches the second hash value, send the depersonalized particular transaction to the issuer's interface processor located in the second jurisdiction via the communications network operated by the switching service.

* * * * *